(12) United States Patent
Seo

(10) Patent No.: US 12,498,731 B2
(45) Date of Patent: Dec. 16, 2025

(54) METHOD AND DEVICE FOR SETTING DRONE FLIGHT PATH

(71) Applicant: KT CORPORATION, Gyeonggi-do (KR)

(72) Inventor: Ho-Seok Seo, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 193 days.

(21) Appl. No.: 17/785,982

(22) PCT Filed: Dec. 17, 2020

(86) PCT No.: PCT/KR2020/018567
§ 371 (c)(1),
(2) Date: Jul. 13, 2022

(87) PCT Pub. No.: WO2021/125838
PCT Pub. Date: Jun. 24, 2021

(65) Prior Publication Data
US 2023/0035682 A1   Feb. 2, 2023

(30) Foreign Application Priority Data

Dec. 17, 2019 (KR) .................. 10-2019-0168918
Dec. 16, 2020 (KR) .................. 10-2020-0176804

(51) Int. Cl.
*G05D 1/00* (2024.01)
*B64C 39/02* (2023.01)
(Continued)

(52) U.S. Cl.
CPC ........... *G05D 1/101* (2013.01); *B64C 39/024* (2013.01); *B64U 10/13* (2023.01); *G06Q 30/04* (2013.01);
(Continued)

(58) Field of Classification Search
CPC .... G05D 1/101; G05D 1/1064; B64C 39/024; G06Q 30/04; G08G 5/0039; G08G 5/0069;
(Continued)

(56) References Cited

U.S. PATENT DOCUMENTS 5,051,750 A * 9/1991 Hollister ................. G01S 13/60
342/115
9,412,278 B1   8/2016 Gong et al.
(Continued)

FOREIGN PATENT DOCUMENTS

EP   3547066 A1   10/2019
JP   2017-526280 A   9/2017
(Continued)

OTHER PUBLICATIONS

C. R. Melugin, Jr. "Advisory Circular, Subject: Approval of Area Navigation Systems for Use in the U.S. National Airspace System" 1975, Department of Transportation, pp. 1-4 (Year: 1975).*
(Continued)

*Primary Examiner* — Aniss Chad
*Assistant Examiner* — Chase L Cooley
(74) *Attorney, Agent, or Firm* — IP Legal Services, LLC

(57) ABSTRACT

Provided are a method and device for setting a flight path reflecting an air space of a drone. The method may include receiving flight data collected by the drone; calculating a path error score indicating an extent of deviation of the drone from a planned flight path by comparing the received flight data with the planned flight path of the drone; adjusting the preset air space of the drone based on the path error score; and generating a new flight path of the drone based on the adjusted air space of the drone and a destination.

8 Claims, 13 Drawing Sheets

(51) Int. Cl.
*B64U 10/13* (2023.01)
*B64U 20/80* (2023.01)
*G06Q 30/04* (2012.01)
*G08G 5/34* (2025.01)
*G08G 5/55* (2025.01)
*G08G 5/57* (2025.01)

(52) U.S. Cl.
CPC .............. *G08G 5/34* (2025.01); *G08G 5/55* (2025.01); *G08G 5/57* (2025.01); *B64U 20/80* (2023.01)

(58) Field of Classification Search
CPC .. G08G 5/0013; G08G 5/0026; G08G 5/0034; G08G 5/0091; B64U 10/13; B64U 20/80; B64U 2201/104
See application file for complete search history.

(56) References Cited

U.S. PATENT DOCUMENTS

| | | | |
|---|---|---|---|
| 10,297,160 | B1 | 5/2019 | O'Leary |
| 2004/0243513 | A1* | 12/2004 | Phillips .................. G06Q 30/04 705/40 |
| 2007/0145184 | A1* | 6/2007 | Baudry ................ G01C 23/005 244/76 R |
| 2010/0292943 | A1* | 11/2010 | Minor .................. G01C 21/188 702/64 |
| 2016/0288905 | A1 | 10/2016 | Gong et al. |
| 2016/0292403 | A1 | 10/2016 | Gong et al. |
| 2016/0292696 | A1 | 10/2016 | Gong et al. |
| 2017/0169713 | A1 | 6/2017 | Gong et al. |
| 2018/0082308 | A1 | 3/2018 | Gong et al. |
| 2018/0211263 | A1 | 7/2018 | Gong et al. |
| 2020/0043350 | A1* | 2/2020 | Cantrell ................. G08G 5/006 |
| 2020/0062394 | A1 | 2/2020 | Bin |
| 2021/0089055 | A1* | 3/2021 | Tran ....................... B64U 10/30 |
| 2021/0097870 | A1 | 4/2021 | Nakadai et al. |
| 2021/0139144 | A1* | 5/2021 | Fujita .................... B64D 45/00 |
| 2021/0208602 | A1 | 7/2021 | Yi et al. |
| 2022/0327552 | A1 | 10/2022 | Gong et al. |

FOREIGN PATENT DOCUMENTS

| | | | | |
|---|---|---|---|---|
| JP | 2019-051839 | A | | 4/2019 |
| KR | 10-2016-0118658 | A | | 10/2016 |
| KR | 2016118658 | A | * 10/2016 | .......... G08G 5/0021 |
| KR | 10-2017-0079379 | A | | 7/2017 |
| KR | 10-2017-0130934 | A | | 11/2017 |
| KR | 10-1803005 | B1 | | 11/2017 |
| KR | 10-2018-0061514 | A | | 6/2018 |
| KR | 10-2018-0104956 | A | | 9/2018 |
| KR | 10-1894409 | B1 | | 9/2018 |
| KR | 10-2019-0035402 | A | | 4/2019 |
| KR | 10-2019-0101332 | A | | 8/2019 |
| WO | 2019/012713 | A1 | | 1/2019 |

OTHER PUBLICATIONS

Mathspays, "Sum and Differences of Areas", 2013, https://www.youtube.com/watch?v=65GuYUkDkXc, 9:00-10:00 (Year: 2013).*
Federal Aviation Administration, Satellite Navigation—GPS—How it Works, 2018, FAA.gov, pp. 1-2 (Year: 2018).*
China National Intellectual Property Administration, Office Action of corresponding CN Patent Application No. 202080096742.2, Nov. 22, 2024.

* cited by examiner

METHOD AND DEVICE FOR SETTING DRONE FLIGHT PATH

CROSS REFERENCE TO RELATED APPLICATIONS

This application is a National Stage Patent Application of PCT International Patent Application No. PCT/KR2020/018567 (filed on Dec. 17, 2020) under 35 U.S.C. § 371, which claims priority to Korean Patent Application Nos. 10-2019-0168918 (filed on Dec. 17, 2019) and 10-2020-0176804 (filed on Dec. 16, 2020), the teachings of which are incorporated herein in their entireties by reference.

TECHNICAL FIELD

The present disclosure relates to technology for setting a flight path of a drone, and more particularly, to a method and device for setting a flight path of a drone by allocating an air space of the drone based on a flight error of the drone analyzed through flight data.

BACKGROUND ART

Drones have been advanced to perform various functions. Accordingly, various types of drones have been introduced, for example, imaging drones, agriculture drones, delivery drones, and air quality measurement drones. Some of them are actually used in related field.

Lately, a method for using mobile communication network to remotely control drones has been introduced. For example, near field wireless communication such as Bluetooth has been used to control drones. In order to remotely control drones in long distance, a drone control technology using mobile communication networks has emerged. The following Patent Literature discloses a drone control system and method using a long-term evolution (LTE) network.

Meanwhile, in order to use drones for delivery, drone collision avoidance technology has emerged. To avoid drone collisions, a central server manages flight schedules of drones and controls the flight schedules to prevent the drones from flying along the same path at the same period of time.

However, the central server only considers the collision risks of the drones based on the flight path and the flight time of the drones. The central server does not consider the flight characteristics of the drones. Additionally, the typical drone control technology does not consider the air spaces of the drones in flight.

Accordingly, there is a need for more efficient control of the flight paths of the drones considering the flight characteristics and the air spaces of the drones.

RELATED LITERATURE

Patent Literature: Korean Patent Publication No. 10-2018-0061514

DISCLOSURE

Technical Problem

The present disclosure is directed to providing a method and device for setting a drone flight path and managing routes in the sky by analyzing a flight error of a drone and selectively enlarging or reducing an air space of the drone based on the analysis results.

These and other objects and advantages of the present disclosure may be understood from the following description and will become apparent from the embodiments of the present disclosure. Additionally, it will be easily understood that the objects and advantages of the present disclosure may be realized by the means set forth in the appended claims and a combination thereof.

Technical Solution

A method for setting a flight path reflecting an air space of a drone according to an embodiment includes receiving flight data collected from the drone; calculating a path error score indicating an extent of deviation of the drone from a planned flight path by comparing the received flight data with the planned flight path of the drone; adjusting the preset air space of the drone based on the path error score; and generating a new flight path of the drone based on the adjusted air space of the drone and a destination.

The adjusting an air space may include reducing the preset air space of the drone when the path error score is equal to or smaller than a first score, maintaining the preset air space of the drone when the path error score is larger than the first score and equal to or smaller than a second score, and enlarging the preset air space of the drone when the path error score is larger than the second score.

The calculating a path error score may include calculating the path error score using at least one of a total deviation number, a total deviation time or a total deviation distance of the drone from the planned flight path by comparing the received flight data with the planned flight path.

The calculating a path error score may include calculating the path error score using a deviation area and a deviation time of the drone from the planned flight path by comparing the received flight data with the planned flight path.

The deviation area may be a 2-dimensional reference area and may be a sum of the deviation area in a latitude/longitude plane, the deviation area in a longitude/altitude plane and the deviation area in a latitude/altitude plane.

The planned flight path may include the preset air space, and the step of calculating the path error score may include calculating the path error score by comparing the preset air space of the drone with the received flight data.

The calculating and adjusting may be repeatedly performed using the flight data of a plurality of flights of the drone at a predetermined time interval or is repeatedly performed every flight of the drone.

The method may further include determining a wind speed along the flight path; and correcting the path error score by applying a meteorological weight that is inversely proportional to the determined wind speed to the path error score.

The method may further include correcting the path error score based on a global positioning system (GPS) error ratio.

The generating a new flight path of the drone may include receiving an origin, the destination and a flight time of the drone, and identifying a flight path of other drone that is set to fly at the flight time; and generating the flight path from the origin to the destination to prevent the adjusted air space of the drone from passing through the air space of the other drone.

The method may further include differently charging a service fee for the drone depending on a size of the air space allocated to the drone.

A device for setting a flight path reflecting an air space of a drone according to an embodiment includes a data collection unit to receive flight data collected by the drone from the drone; an error analysis unit to calculate a path error score indicating an extent of deviation the drone from a planned flight path by comparing the received flight data with the planned flight path of the drone; an air space setting unit to adjust the preset air space of the drone based on the path error score; and a flight path generation unit to generate a new flight path of the drone based on the adjusted air space of the drone and a destination of the drone.

The air space setting unit may reduce the air space of the drone when the path error score is equal to or smaller than a first score, maintain the air space of the drone when the path error score is larger than the first score and equal to or smaller than a second score, and enlarge the air space of the drone when the path error score is larger than the second score.

The error analysis unit may calculate the path error score using at least one of a total deviation number, a total deviation time or a total deviation distance of the drone from the planned flight path by comparing the received flight data with the planned flight path.

The error analysis unit may calculate the path error score using a deviation area and a deviation time of the drone from the planned flight path by comparing the received flight data with the planned flight path.

The deviation area may be a 2-dimensional reference area and may be a sum of the deviation area in a latitude/longitude plane, the deviation area in a longitude/altitude plane and the deviation area in a latitude/altitude plane.

The planned flight path may include the preset air space, and the error analysis unit may calculate the path error score by comparing the preset air space of the drone with the received flight data.

The error analysis unit and the air space setting unit may calculate the path error score and adjust the air space of the drone every flight of the drone or at a predetermined time interval.

The error analysis unit may determine a wind speed along the flight path and correct the path error score by applying a meteorological weight that is inversely proportional to the determined wind speed to the path error score.

The error analysis unit may correct the path error score based on a GPS error ratio.

The flight path generation unit may receive an origin, the destination and a flight time of the drone, identify a flight path of other drone that is set to fly at the flight time, and generate the flight path from the origin to the destination to prevent the set air space of the drone from passing through an air space of the other drone.

The flight path setting device may further include a service fee charging unit to differently charge a service fee for the drone depending on a size of the air space allocated to the drone.

Advantageous Effects

According to the present disclosure, flight routes may be managed more efficiently by collecting and analyzing flight data of drones, analyzing flight errors of the drones, such as a deviation number, a deviation time, a deviation distance, and a deviation area of the drones, and selectively enlarging or reducing air spaces of the drones based on the analysis results.

According to the present disclosure, the flight errors of the drones may be analyzed more accurately by correcting the flight errors of the drones based on weather conditions and global positioning system (GPS) errors.

According to the present disclosure, the air spaces may be adaptively allocated based on the flight characteristics of the drones by setting comparatively wider air spaces for drones that do not accurately fly along designated paths and setting comparatively narrower air spaces for drones that fly through relatively accurate paths, considering flight characteristics of the drones.

According to the present disclosure, the profits of the air space managers may increase, and more drones having high performance may be allowed to fly in a limited space by allocating comparatively smaller air spaces to drones having higher performance and comparatively larger air spaces to drones having lower performance and differently charging service fees.

DESCRIPTION OF DRAWINGS

The accompanying drawings illustrate the exemplary embodiments of the present disclosure, and together with the detailed description for the embodiment of the present disclosure, serve to provide a further understanding of the technical aspects of the present disclosure, and thus the present disclosure should not be construed as being limited to the drawing.

BEST MODE

The above-described objects, features and advantages will be apparent through the following detailed description related to the accompanying drawings, and accordingly, those having ordinary skill in the technical field pertaining to the present disclosure will easily practice the technical aspects of the present disclosure. Additionally, in describing the present disclosure, when it is deemed that a certain detailed description of known technology relevant to the present disclosure may unnecessarily obscure the subject matter of the present disclosure, its detailed description is omitted. Hereinafter, an exemplary embodiment according to the present disclosure will be described in detail with reference to the accompanying drawings.

Figure 1:
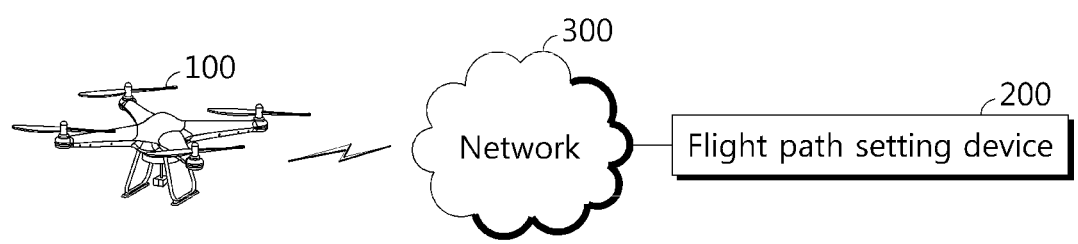
FIG. 1 is a diagram for explaining a flight path setting device according to an embodiment of the present disclosure.

FIG. 1 is a diagram for explaining a flight path setting device according to an embodiment of the present disclosure. As shown in FIG. 1, a flight path setting device 200 according to an embodiment of the present disclosure communicates with a drone 100 via a network 300. The network 300 includes a mobile communication network, a wired communication network, and a near field wireless communication network.

The drone 100 is an unmanned flying object and includes a mobile communication module and a global positioning system (GPS) receiver to communicate with the network 300. Additionally, the drone 100 may fly autonomously to a destination along a movement path (e.g., flight path, flight route). The drone 100 may autonomously fly by receiving a flight path including GPS latitudes/longitude coordinates and altitudes in a sequential order from origin to destination from the flight path setting device 200 and comparing the flight path with the current location. Preferably, the flight path may further include time. In this case, data of the flight path may be in a (x, y, z, t) format. Here, x is the latitude, y is the longitude, z is the altitude, and t is the time.

Additionally, the drone 100 may receive a control command from a drone controller (not shown) and operate according to the control command. Additionally, when flight starts, the drone 100 continuously measures the current location (i.e., GPS latitude/longitude coordinates, altitude) at a predetermined time interval using the GPS receiver until the end of the flight and transmits flight data including the measured location records on time series to the flight path setting device 200. The altitude may be measured by the GPS receiver or a dedicated altitude measurement sensor. Meanwhile, the drone 100 detects the current location and locations on the flight path. When the drone 100 is deviating from the flight path, the drone 100 returns to the flight path to fly along the planned path.

The flight path setting device 200 determines a flight error of the drone 100 by analyzing the flight data received from the drone 100 and sets an air space of the drone 100 according to the flight error. The air space refers to a spatial region in the sky where the drone 100 can fly without being intruded on by other drones. The flight path setting device 200 may set the flight path of each drone based on the air space of each drone to prevent the air spaces of the drones from overlapping each other.

Figure 2:
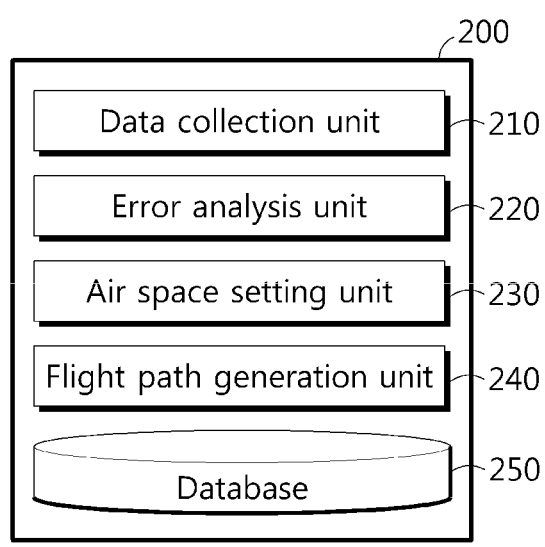
FIG. 2 is a block diagram showing a flight path setting device according to an embodiment of the present disclosure.

FIG. 2 is a block diagram showing the flight path setting device according to an embodiment of the present disclosure. As shown in FIG. 2, the flight path setting device 200 may include a data collection unit 210, an error analysis unit 220, an air space setting unit 230, a flight path generation unit 240 and a database 250. These constituent elements may be implemented through a combination of hardware and software. Additionally, the flight path setting device 200 may include at least one processor and memory, and the data collection unit 210, the error analysis unit 220, the air space setting unit 230 and the flight path generation unit 240 may be stored in the memory in the form of a program that is executed by the processor. The flight path setting device 200 may be mounted in a cloud computing system. In this case, the data collection unit 210, the error analysis unit 220, the air space setting unit 230 and the flight path generation unit 240 may be implemented in the cloud computing system in the form of virtual machine.

The database 250 is a storage means such as memory and disc and stores the flight data of the drone 100. Additionally, the database 250 may store the air space set (e.g., allocated or designated) for each drone. Additionally, the database 250 may store coordinates information of a flight restriction zone. The flight restriction zone may include tall building areas, military zones, security zones and hazardous material storage area. Additionally, the database 250 stores flight path information for each drone 100. The flight path information includes the planned GPS latitude/longitude coordinates and altitudes indicating the movement path (e.g., flight path, flight route) from origin to destination and the flight times. For example, the flight path information is a set of points in the sky space, and each point may be expressed as (latitude, longitude, altitude, time).

Figure 3:
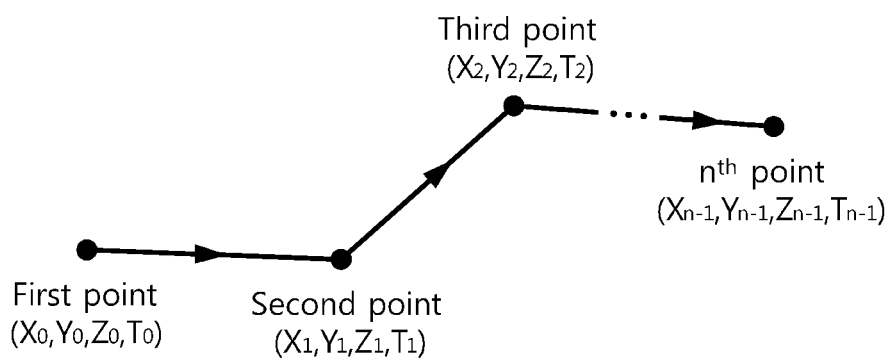
FIG. 3 is a diagram showing flight path information according to an embodiment of the present disclosure.

FIG. 3 is a diagram showing the flight path information according to an embodiment of the present disclosure. Referring to FIG. 3, the drone 100 is allocated with the flight path information from a first point as the origin to an $n^{th}$ point as the destination. Each point is expressed as (latitude, longitude, altitude, time). For example, the first point is expressed as $(X_0, Y_0, Z_0, T_0)$, the second point is expressed as $(X_1, Y_1, Z_1, T_1)$, the third point is expressed as $(X_2, Y_2, Z_2, T_2)$, and the $n^{th}$ point is expressed as $(X_{n-1}, Y_{n-1}, Z_{n-1}, T_{n-1})$. The drone 100 flies at the corresponding (latitude, longitude, altitude), i.e., (X, Y, Z) coordinates, at the time T of each point.

The data collection unit 210 receives the flight data from the drone 100 and stores the flight data in the database 250. The flight data includes the time, the GPS latitude/longitude coordinates and the altitudes indicating the flight path along which the drone 100 actually moved.

The error analysis unit 220 analyzes a difference between the planned flight path and the actual flight path by comparing the flight path provided to the drone 100 and the flight data received from the drone 100 and calculates a score for a path error indicating the extent to which the drone 100 deviates from the flight path.

In an embodiment, the error analysis unit 220 determines each of the total deviation number of the drone 100 from the planned flight path, the total deviation distance of the drone 100 from the planned flight path and the total deviation time of the drone 100 from the planned flight path by comparing the planned GPS coordinates and altitudes included in the flight path provided to the drone 100 with the actually moved GPS coordinates and altitudes included in the flight data. The deviation time from the planned flight path may be calculated by an interval between points in time at which the drone 100 deviated from the planned flight path. The error analysis unit 220 calculates the score for the flight path error by summing the total deviation number of the drone 100 from the flight path, the total deviation distance of the drone 100 from the flight path and the total deviation time of the drone 100 from the flight path. A predefined weight may be applied to each of the total deviation number, the total deviation distance and the total deviation time, and the error analysis unit 220 may calculate the score for the flight path error (hereinafter referred to as the 'path error score') by summing the weighted total deviation number, the weighted total deviation distance, and the weighted total deviation time. Preferably, the error analysis unit 220 may calculate the total deviation number, the total deviation distance, and the total deviation time of the corresponding drone 100 from the corresponding air space based on the flight path of the drone 100 generated by the flight path generation unit 240 and the air space of the drone 100 set by the air space setting unit 230.

In another embodiment, the error analysis unit 220 may determine the deviation time and area of the drone 100 from the planned flight path by comparing the planned GPS coordinates and altitudes included in the flight path provided to the drone 100 with the actually moved GPS coordinates and altitudes of the drone 100 included in the flight data and calculate the score for the flight path error using the deviation time and area. The error analysis unit 220 calculates a 2-dimensional (2D) reference area as the deviation area. The 2D reference area may be defined as the sum of deviation area A in the xy plane of latitude/longitude, deviation area B in the xz plane of latitude/altitude and deviation area C in the yz plane of longitude/altitude, calculated using latitude, longitude and altitude. Preferably, the error analysis unit 220 may calculate the deviation area and time of the corresponding drone 100 from the corresponding air space based on the flight path of the drone 100 generated by the flight path generation unit 240 and the air space of the drone 100 set by the air space setting unit 230.

FIGS. 4A to 4D are diagrams illustrating the method for calculating the deviation area of the drone from the air space according to an embodiment of the present disclosure.

Figure 4A:
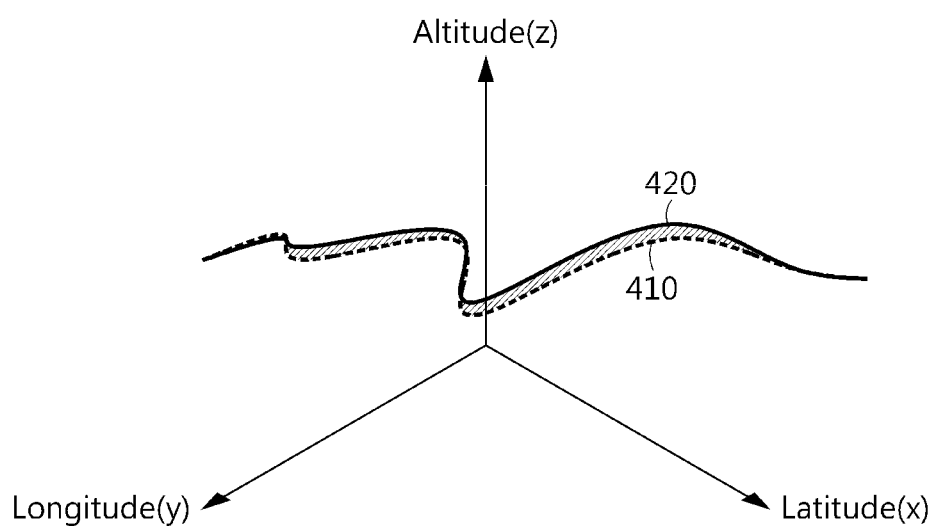
FIGS. 4A to 4D are diagrams illustrating a method for calculating a deviation area of a drone from an air space according to an embodiment of the present disclosure.

FIG. 4A is a diagram showing a sky space expressed with x axis representing the latitude, y axis representing the longitude and z axis representing the altitude. In FIG. 4A, the reference number 410 indicates the planned flight path of the drone 100, and the reference number 420 indicates the actual flight path of the drone 100. In this instance, a planned flight path 410 is the air space of the drone 100 and may have a 3D cylindrical or 4D quadrangular prism shape, but in this embodiment, it is represented by the dashed line for convenience of description. A deviation area may be defined as the sum of a deviation area A in the xy plane of latitude/longitude, a deviation area B in the xz plane of latitude/altitude and a deviation area C in the yz plane of longitude/altitude.

Figure 4B:
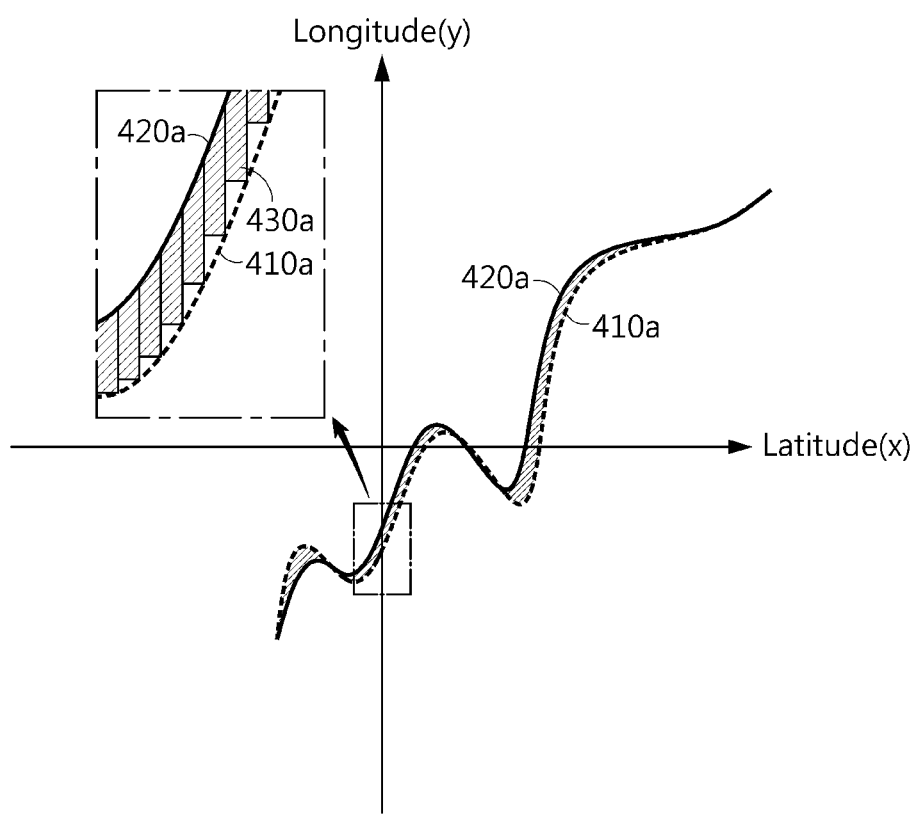

FIG. 4B shows a planned flight path 410a and an actual flight path 420a of the drone 100 in the xy plane of latitude/longitude. That is, in FIG. 4A, the planned flight path 410 and the actual flight path 420 of the drone 100 are projected onto the xy plane. When the drone 100 deviates from the planned flight path 410a at a time t1 and returns to the planned flight path 410a at a time t2, an area between the planned flight path 410a and the actual flight path 420a in the xy plane for the deviation time t2−t1 is the deviation area A. Preferably, the deviation area A may be calculated by the sum of small rectangles 430a in the unit of 1 sec for the deviation time. However, this is provided for illustrative purposes, and the unit time may be adjusted.

Figure 4C:
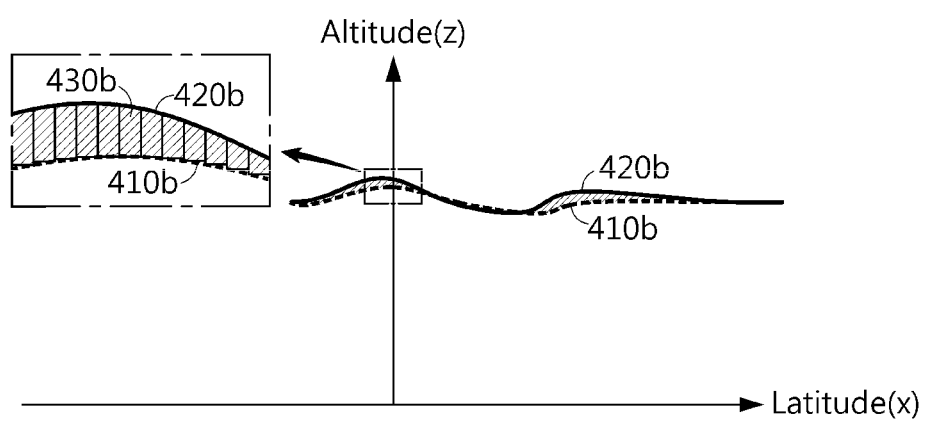

FIG. 4C shows the planned flight path 410b and the actual flight path 420b of the drone 100 in the xz plane of latitude/altitude. That is, in FIG. 4A, the planned flight path 410 and the actual flight path 420 of the drone 100 are projected onto the xz plane. When the drone 100 deviates from the planned flight path 410b at a time t1 and returns to the planned flight path 410b at a time t2, an area between the planned flight path 410b and the actual flight path 420b in the xz plane for the deviation time t2−t1 is the deviation area B. Preferably, the deviation area B may be calculated by the sum of small rectangles 430b in the unit of 1 sec for the deviation time. However, this is provided for illustrative purposes, and the unit time may be adjusted.

Figure 4D:
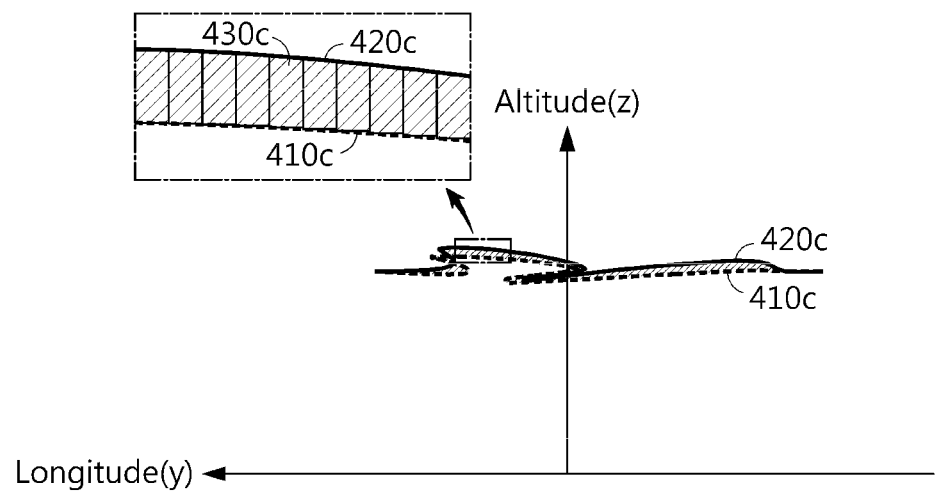

FIG. 4D shows the planned flight path 410c and the actual flight path 420c of the drone 100 in the yz plane of longitude/altitude. That is, in FIG. 4A, the planned flight path 410 and the actual flight path 420 of the drone 100 are projected onto the yz plane. When the drone 100 deviates from the planned flight path 410c at a time t1 and returns to the planned flight path 410c at a time t2, an area between the planned flight path 410c and the actual flight path 420c in the yz plane for the deviation time t2−t1 is the deviation area C. Preferably, the deviation area C may be calculated by the sum of small rectangles 430c in the unit of 1 sec for the deviation time. However, this is provided for illustrative purposes, and the unit time may be adjusted.

After the error analysis unit 220 calculates the deviation time T(=t2−t1) and the deviation area (A+B+C) by the method described with reference to FIGS. 4A to 4D, the error analysis unit 220 may calculate the flight path error score S as shown in the following equation 1.

$$S = \alpha \times T + \beta \times (A+B+C) \quad \text{(Equation 1)}$$

Here, $\alpha$ and $\beta$ are weights, and each value is greater than 0. The weight of greater than 1 is applied to a factor having relatively higher importance, and the weight of smaller than 1 is applied to a factor having relatively lower importance. For example, $\alpha$ may be 0.8, and $\beta$ may be 1.2. Alternatively, in case that the time and the deviation area are regarded as the equivalent factors, both $\alpha$ and $\beta$ may be 1.

In another embodiment, the error analysis unit 220 may calculate the flight path error score, considering the total deviation number of the drone 100 from the planned flight path, the total deviation distance of the drone 100 from the planned flight path, the total deviation time of the drone 100 from the planned flight path and the total deviation area. The error analysis unit 220 may calculate the flight path error score S by applying the weight to each of the total deviation number, the total deviation distance, the total deviation time and the total deviation area as shown in the following Equation 2.

$$S = \alpha \times \text{number} + \beta \times \text{area} + \gamma \times \text{time} + \delta \times \text{distance} \quad \text{(Equation 2)}$$

Here, $\alpha$, $\beta$, $\gamma$, $\delta$ are weights, and each value is greater than 0. The weight of greater than 1 is applied to a factor having relatively higher importance, and the weight of smaller than 1 is applied to a factor having relatively lower importance. For example, even in case that the total deviation area of a first drone is equal to the total deviation area of a second drone, when the total deviation time of the first drone is shorter than the total deviation time of the second drone, it may be determined that the flight performance of the first drone is lower than that of the second drone. That is, it may be determined that the second drone follows the planned air space better than the first drone. Accordingly, in this case, the value of $\beta$ may be set to be smaller than the value of $\gamma$ to make the time have a greater influence on the error score. In this way, the weight may be properly adjusted depending on situations.

The error analysis unit 220 may calculate the path error score by normalizing each of the total deviation number, the total deviation distance, the total deviation time, and the total deviation area. Hereinafter, the normalization method will be described as taking the total deviation number for an example. The error analysis unit 220 accumulates and stores the deviation number of all the drones 100 from the planned flight paths, performs a Z-Score normalization, and sets the bottom 5% of deviation number (i.e., a Z score) as a minimum deviation number and the top 5% of deviation number (i.e., a Z score) as a maximum deviation number. Here, the top and bottom % is provided for illustrative purposes, and the controller may set the top and bottom % according to the operational situation of the drone 100 and the top and bottom % may be subject to change depending on the situation. The Z-Score normalization refers to the standard normal distribution having the mean of 0 and the standard deviation of 1. After the minimum deviation number $A_{min}$ and the maximum deviation number $A_{max}$ are set, when the total deviation number of the specific drone 100 from the specific flight path is calculated, the Z score $A_{in}$ is calculated by Z-Score normalization of the corresponding total deviation number. Additionally, the error analysis unit 220 may calculate a min-max normalization value $A_n$ of the total deviation number as shown in the following Equation 3. The following min-max normalization value $A_n$ has a value between 0 and 100.

$$A_n = (A_{in} - A_{min}) \times 100 / (A_{max} - A_{min}) \quad \text{(Equation 3)}$$

Here, when $A_{in}$ is larger than $A_{max}$, $A_{in}$ is calculated as $A_{max}$, and when $A_{in}$ is smaller than $A_{min}$, $A_{in}$ is calculated as $A_{min}$.

By the above-described process, when the min-max normalization value of each factor, i.e., the total deviation number, the total deviation distance, the total deviation time and the total deviation area is calculated, each factor has a value between 0 and 100. Accordingly, the final path error score is calculated by applying the weight to the min-max normalization value of each factor and summing up.

The error analysis unit 220 may determine the wind speed along the flight path at the flight time of the drone 100 and correct the path error score by further applying a meteorological weight for the wind speed to the path error score according to the wind speed. The path error score is corrected by multiplying the path error score by the meteorological weight. The meteorological weight may be applied to the path error score such that as the wind is stronger, the path error score is lower. For example, when the wind is strong, the deviation number of the drone 100 from the flight path will increase due to the external environment (i.e., wind), not the performance of the drone. Accordingly, as a result of analyzing the flight data of the drone 100 flying in the weather condition of strong wind, the path deviation number of the corresponding drone 100 is relatively large, and as a result, the path error score will be relatively high. That is, even in the case of the same drone 100, when the drone 100 flies in the meteorological environment of strong wind, the path error score of the drone 100 will be found high. On the contrary, when the drone 100 flies in the meteorological environment of weak wind, the path error score of the drone 100 will be found low. To minimize the change in the path error score by the external environment such as the wind speed and objectively calculate the error score according to the flight performance of the drone 100, the error analysis unit 220 may determine the wind speed at the flight time of the drone 100 and correct the path error score by applying the meteorological weight that is inversely proportional to the wind speed to the path error score. That is, when the wind is strong, the error analysis unit 220 applies the meteorological weight that is inversely proportional to the wind speed to the path error score to prevent the path error score from increasing according to the wind speed. For example, when there is almost no wind (i.e., less than a specific threshold), the meteorological weight may be set to '1' to maintain the path error score. When the wind speed is equal to or higher than the predetermined level, the meteorological weight of smaller than '1' may be applied to the path error score to reduce the error score in proportion to the wind speed considering the fact that the drone 100 frequently deviates from the planned path according to the wind speed.

Additionally, the error analysis unit 220 may correct the path error score by applying a GPS error ratio to the path error score. For example, when the GPS error ratio is 2%, the path error score may be corrected by adding 2% of the path error score to the path error score. Preferably, the error analysis unit 220 may correct the path error score by reflecting both the GPS error ratio and the wind speed together.

Figure 5:
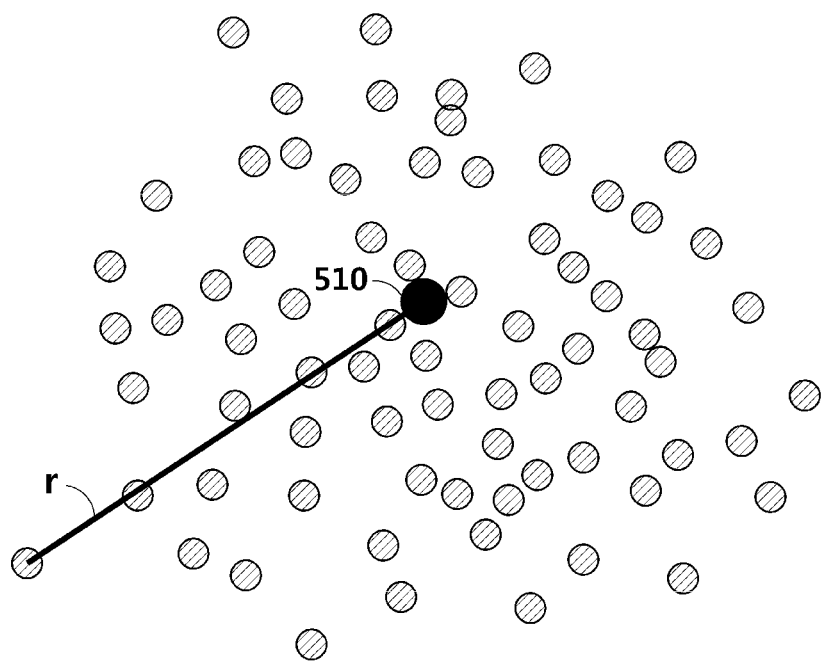
FIG. 5 is a diagram showing an actual flight location of a drone according to an embodiment of the present disclosure.

The air space setting unit 230 allocates the air space of the drone 100. As described above, the air space refers to a spatial region in the sky where the drone 100 can fly without being intruded on by other drones. When the drone 100 flies for the first time, the air space setting unit 230 allocates the maximum error radius of deviation of the drone 100 from the planned flight path as a reference air space using the flight data of the drone 100 collected for the predetermined time. FIG. 5 is a diagram showing the actual flight location of the drone according to an embodiment of the present disclosure. FIG. 5 shows the planned flight location and the actual flight location of the drone 100 when the drone 100 is viewed from the flight direction of the drone 100. In FIG. 5, a point 510 is the planned flight location of the drone 100, and remaining points are the actual flight locations of the drone 100. A distance r, which is the longest distance from the planned flight location 510 to the actual flight location, may be determined as the radius of the initial reference air space of the corresponding drone 100.

After the air space setting unit 230 allocates the initial reference air space of the drone 100, the air space setting unit 230 may re-adjust the air space of the drone 100 at a predetermined time interval based on the error score calculated by the error analysis unit 220. Preferably, the air space setting unit 230 may re-adjust the previous air space using the previous flight data each time the drone 100 flies, or the air space setting unit 230 may collect the flight data at the predetermined time interval (for example, a month) and re-adjust the previous air space.

The air space setting unit 230 may determine the extent of enlargement or reduction of the flight air space corresponding to the path error score of the drone with reference to the following Table 1, and the air space setting unit 230 may set the air space of the drone 100 by maintaining, enlarging or reducing the existing air space (e.g., previous air space) of the drone 100 according to the change.

The following Table 1 is a mapping table between the path error score and the change of the air space of the drone. The air space setting unit 230 may set the air space of the drone 100 with reference to the following Table 1.

TABLE 1

| Error score (S) | Flight grade | Change of air space |
|---|---|---|
| S ≤ 10 | 1 | Reduce air space by 90% |
| 10 < S ≤ 20 | 2 | Maintain air space |
| 20 < S ≤ 30 | 3 | Enlarge air space by 110% |
| 30 < S ≤ 40 | 4 | Enlarge air space by 120% |
| 40 < S ≤ 50 | 5 | Enlarge air space by 130% |

Describing with reference to Table 1, when the path error score calculated by the error analysis unit 220 is equal to or smaller than 10, the air space setting unit 230 may identify that the flight grade of the drone is '1' and reduce the size of the currently set air space of the drone 100 by 90%. Additionally, when the path error score calculated by the error analysis unit 220 is larger than 10 and equal to or smaller than 20, the air space setting unit 230 may identify that the flight grade of the drone is '2' and maintain the set air space of the drone 100, and when the path error score is larger than 20 and equal to or smaller than 30 (i.e., the flight grade of the drone is '3'), the air space setting unit 230 may enlarge the set air space of the drone 100 by 110%. When the path error score is larger than 30 and equal to or smaller than 40 (i.e., the flight grade of the drone is '4'), the air space setting unit 230 may enlarge the set air space of the drone 100 by 120%, and when the path error score is larger than 30 and equal to or smaller than 40 (i.e., when the flight grade of the drone is '5'), may enlarge the set air space of the drone 100 by 130%.

The air space may be a cylindrical shape as described with reference to FIG. 4 or a rectangular duct shape, but the embodiments are not necessarily limited thereto.

Figure 6:
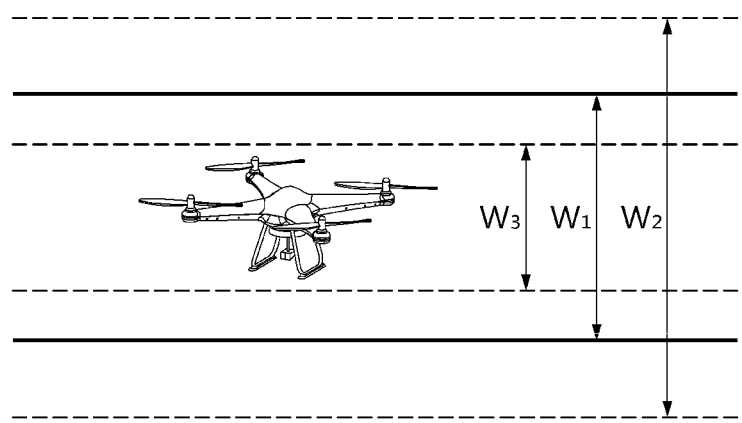
FIG. 6 is a diagram showing air spaces of different sizes.

FIG. 6 shows the air spaces of different sizes. Referring to FIG. 6, the allocated air space of the drone 100 may have a default width W1 based on the flight path. Alternatively, as described above, the maximum error radius based on the flight path may be allocated as the width of the air space using the flight data of the drone 100 collected for the predetermined time. When the drone 100 frequently deviates from the planned flight path, the air space of a width W2 wider than the default width W1 may be allocated for the air space of the drone 100. On the contrary, when the drone 100 scarcely deviates from the planned flight path, a width W3 narrower than the default width W1 may be allocated to the air space of the drone 100. The air space of the drone 100 cannot be reduced or enlarged unlimitedly and may have a preset lower limit that restricts the reduction of the air space and a preset upper limit that restricts the enlargement of the air space.

The flight path generation unit 240 receives origin information, destination information and flight time of the drone 100, and generates the flight path from origin to destination based on the received information. In this instance, the flight path generation unit 240 may identify the flight restriction zone stored in the database 250 and generate the flight path from origin to destination having the sequential coordinates avoiding passing through the flight restriction zone. Additionally, the flight path generation unit 240 may identify the flight schedule of another drone having the same flight time and the flight path and the air space of another drone 100 in the database 250 and generate the flight path to prevent the air space of the drone 100 from going into the air space of another drone. That is, the flight path generation unit 240 generates the flight path of the drone 100 to prevent the air space of the drone 100 and the air space of another having the same flight schedule from overlapping each other. Preferably, the flight path generation unit 240 generates the flight path of the drone 100 to have the distance between the air space of the drone 100 and the air space of another drone to be equal to or greater (e.g., longer) than a predetermined distance.

For example, when the air space of the drone 100 at $T_0$ is a circle having the radius of $W_O$ distance with respect to the flight coordinates ($X_0$, $Y_0$, $Z_0$) and the air space of another drone at the same time $T_0$ is a circle having the radius of $W'_0$ distance with respect to the flight coordinates ($X'_0$, $Y'_0$, $Z'_0$), the flight path of the drone 100 is generated such that the two circles do not overlap, or the distance between the two circles is equal to or larger than the predetermined threshold distance q.

Figure 7:
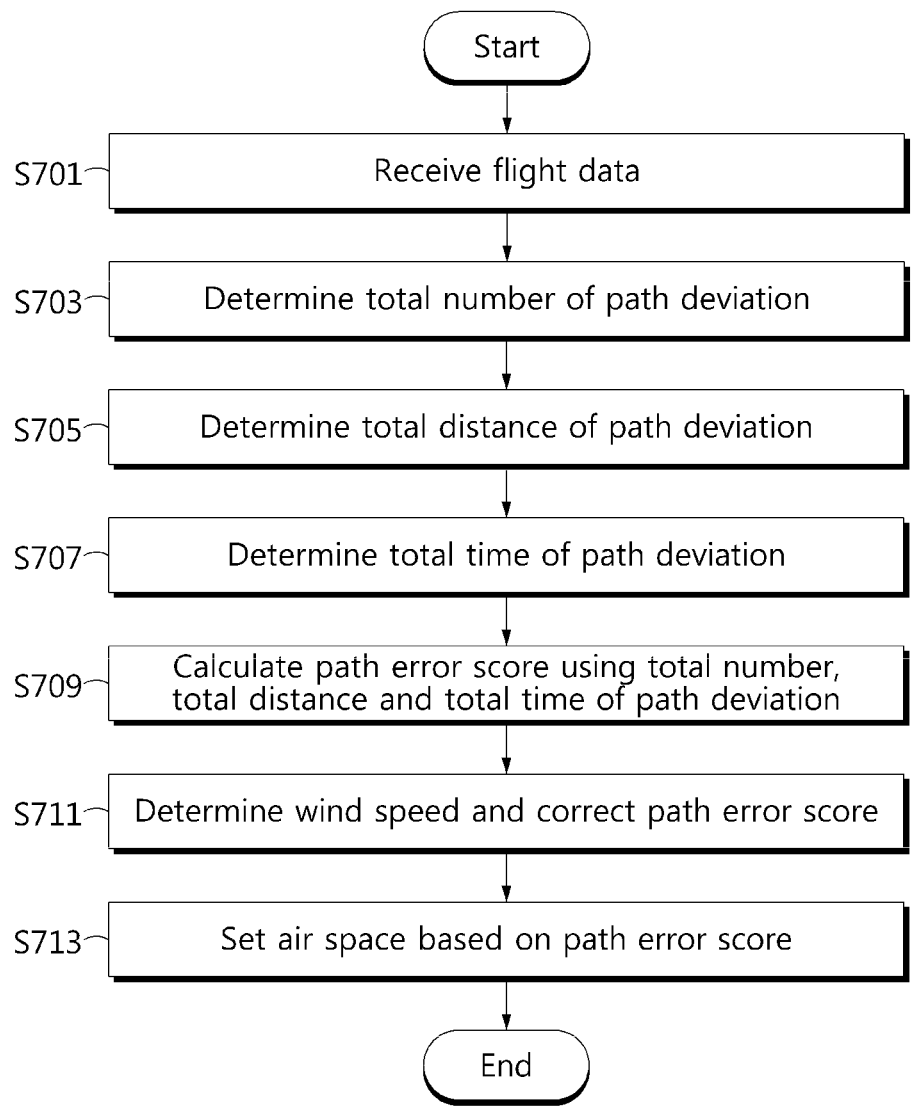
FIG. 7 is a flowchart illustrating a method for calculating a path error score of a drone by analyzing flight data received from the drone by a flight path setting device according to an embodiment of the present disclosure.

FIG. 7 is a flowchart illustrating a method for calculating a path error score of a drone by analyzing flight data received from the drone by a flight path setting device according to an embodiment of the present disclosure.

Referring to FIG. 7, after the drone 100 receives the flight path including the sequential coordinate records from origin to destination from the flight path setting device 200, the drone 100 flies along the flight path. That is, the flight path generation unit 240 of the flight path setting device 200 generates the flight path of the drone 100 that does not overlap the air space of another drone through the process of FIG. 9 as described below and provides it to the drone 100, and the drone 100 autonomously flies by comparing the coordinates and altitudes included in the flight path with the present coordinates and altitudes measured through the GPS receiver. During the flight, the drone 100 collects GPS latitude/longitude coordinates and altitudes using the GPS receiver, generates the flight data including the collection time and the collected GPS latitude/longitude coordinates and altitudes and transmits the flight data to the flight path setting device 200.

Subsequently, the data collection unit 210 of the flight path setting device 200 receives the flight data from the drone 100 and stores the flight data in the database 250 (S701). Subsequently, the error analysis unit 220 analyzes the error between the planned flight path and the actual flight path by comparing the flight path provided to the drone 100 by the flight path generation unit 240 with the flight data received from the drone 100. Specifically, the error analysis unit 220 determines each of the total deviation number of the drone 100 from the planned flight path, the total deviation distance of the drone 100 from the planned flight path, and the total deviation time of the drone 100 from the planned flight path by comparing the GPS coordinates and altitudes included in the flight path provided to the drone 100 with the actually moved GPS coordinates and altitudes included in the flight data (S703, S705, S707). In an embodiment, the error analysis unit 220 may calculate the deviation number, the deviation distance, and the deviation time based on the preset air space of the drone 100.

The error analysis unit 220 calculates the path error score by summing the total deviation number of the drone 100 from the planned flight path, the total deviation distance of the drone 100 from the planned flight path, and the total deviation time of the drone 100 from the planned flight path (S709). The predefined weight may be applied to each of the total deviation number, the total deviation distance, and the total deviation time, and the error analysis unit 220 may calculate the path error score by summing the weighted total deviation number, the weighted total deviation distance, and the weighted total deviation time. Meanwhile, the error analysis unit 220 may calculate the path error score using some of the total deviation number, the total deviation distance, and the total deviation time rather than all of them. Preferably, the error analysis unit 220 may calculate the min-max normalization value for each of the total deviation number, the total deviation distance, and the total deviation time, and calculate the path error score by applying the weight to the min-max normalization value.

Subsequently, the error analysis unit 220 connects to a meteorological administration server and determines the wind speed along the flight path of the drone 100 at the flight time of the drone 100, and selectively corrects the path error score to reduce or maintain the path error score according to the wind speed (S711). As described above, the error analysis unit 220 selectively corrects the path error score by applying the meteorological weight that is inversely proportional to the wind speed to the path error score to cancel out the reflection of the external environment variable (i.e., the wind speed) on the path error score. The meteorological weight that makes the path error score smaller as the wind is stronger is applied to the path error score.

Subsequently, the air space setting unit 230 sets the air space of the drone 100 by maintaining, enlarging, or reducing the air space of the drone 100 based on the calculated error score (S713). For example, when the calculated error score is equal to or smaller than a first score, the air space setting unit 230 reduces the air space of the drone 100 by a preset ratio. When the calculated error score is larger than the first score and equal to or smaller than a second score, the air space setting unit 230 maintains the air space of the drone 100. Meanwhile, when the calculated error score is larger than the second score, the air space setting unit 230 enlarges the air space of the drone 100 by a preset ratio.

Meanwhile, reference may be made to the set air space of the drone 100 when setting the air space of the other drone having the same model as the drone 100.

Additionally, when the error analysis unit 220 has already calculated the path error score of the drone 100 multiple times, the air space setting unit 230 may determine an average of path error scores, and maintain, enlarge, or reduce the air space of the drone 100 based on the average of path error scores.

Figure 8:
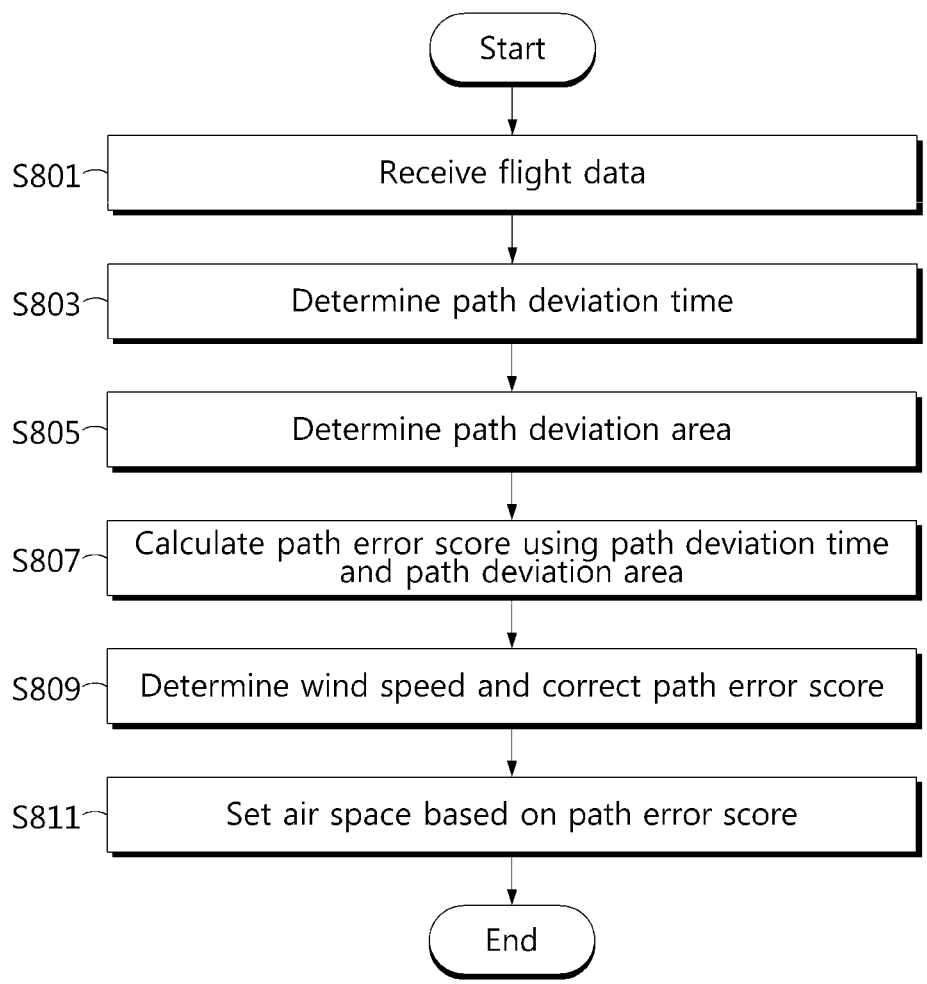
FIG. 8 is a flowchart illustrating a method for calculating a path error score of a drone by analyzing flight data received from the drone by a flight path setting device according to another embodiment of the present disclosure.

FIG. 8 is a flowchart illustrating a method for calculating a path error score of to drone by analyzing flight data received from a drone by a flight path setting device according to another embodiment of the present disclosure.

Referring to FIG. 8, after the drone 100 receives the flight path including the sequential coordinate records from origin to destination from the flight path setting device 200, the drone 100 flies along the flight path. That is, the flight path generation unit 240 of the flight path setting device 200 may generate the flight path of the drone 100 that does not overlap the air space of another drone through the process of FIG. 9 as described below and provide the flight path to the drone 100, and the drone 100 autonomously flies by comparing the coordinates and altitudes included in the flight path with the present coordinates and altitude measured through the GPS receiver. During the flight, the drone 100 collects GPS latitude/longitude coordinates and altitudes using the GPS receiver, generates the flight data including the collection time and the collected GPS latitude/longitude coordinates and altitudes and transmits the flight data to the flight path setting device 200.

Subsequently, the data collection unit 210 of the flight path setting device 200 receives the flight data from the drone 100 and stores the flight data in the database 250 (S801). Subsequently, the error analysis unit 220 analyzes the error between the planned flight path and the actual flight path by comparing the flight path provided to the drone 100 by the flight path generation unit 240 with the flight data received from the drone 100. For example, the error analysis unit 220 determines the deviation time and the deviation area of the drone 100 from the planned flight path by comparing the GPS coordinates and altitudes included in the flight path provided to the drone 100 with the actually moved GPS coordinates and altitudes included in the flight data (S803, S805). In an embodiment, the error analysis unit 220 may calculate the deviation time and the deviation area based on the preset air space of the drone 100. The error analysis unit 220 calculates a 2D reference area as the deviation area. The 2D reference area may be defined as the sum of the deviation area A in the xy plane of latitude/longitude, the deviation area B in the xz plane of latitude/altitude and the deviation area C in the yz plane of longitude/altitude. Preferably, the error analysis unit 220 may calculate the deviation area and the deviation time of the corresponding drone 100 from the corresponding air space based on the flight path of the drone 100 generated by the flight path generation unit 240 and the air space of the drone 100 set by the air space setting unit 230.

The error analysis unit 220 calculates the path error score by summing the deviation time and the deviation area of the drone 100 from the planned flight path (S807). The pre- defined weight may be applied to each of the deviation time and the deviation area, and the error analysis unit 220 may calculate the path error score by summing the weighted deviation time and the weighted deviation area. Preferably, the error analysis unit 220 may calculate the min-max normalization value for each of the deviation time and the deviation area and calculate the path error score by applying the weight to the min-max normalization value.

Subsequently, the error analysis unit 220 connects to the meteorological administration server, determines the wind speed along the flight path of the drone 100 at the flight time of the drone 100, and selectively corrects the path error score to reduce or maintain the path error score according to the wind speed (S809). As described above, the error analysis unit 220 selectively corrects the path error score by applying the meteorological weight that is inversely proportional to the wind speed to the path error score to cancel out the reflection of the external environment variable (i.e., the wind speed) on the path error score. The meteorological weight makes the path error score smaller as the wind is stronger and is applied to the path error score.

Subsequently, the air space setting unit 230 sets the air space of the drone 100 by maintaining, enlarging, or reducing the air space of the drone 100 based on the calculated error score (S811). For example, when the calculated error score is equal to or small than the first score, the air space setting unit 230 reduces the air space of the drone 100 by the preset ratio. When the calculated error score is larger than the first score and equal to or smaller than the second score, the air space setting unit 230 maintains the air space of the drone 100. When the calculated error score is larger than the second score, the air space setting unit 230 enlarges the air space of the drone 100 by the preset ratio.

In accordance with still another embodiment, the error analysis unit 220 may calculate the flight path error, considering all the total deviation number of the drone 100 from the planned flight path, the total deviation distance of the drone 100 from the planned flight path, the total deviation time of the drone 100 from the planned flight path and the total deviation area. The error analysis unit 220 may calculate the flight path error by applying the weight to each of the total deviation number, the total deviation distance, the total deviation time, and the total deviation area.

In the embodiments described with reference to FIGS. 7 and 8, the error analysis unit 220 determines the wind speed along the flight path at the flight time of the drone 100 and corrects the path error score by applying the meteorological weight for the wind speed to the path error score according to the wind speed. In still another embodiment, the error analysis unit 220 may correct the path error score by applying the GPS error ratio to the path error score. For example, when the GPS error ratio is 2%, the error analysis unit 220 may correct the path error score by adding 2% of the path error score to the path error score. Both the GPS error ratio and the wind speed may be considered together.

Additionally, in the embodiments described with reference to FIGS. 7 and 8, in re-adjusting the air space of the drone 100 based on the path error score, the maximum error radius of deviation of the drone 100 from the planned flight path using the flight data of the drone 100 collected for the predetermined time may be set as the initial reference air space of the drone.

Figure 9:
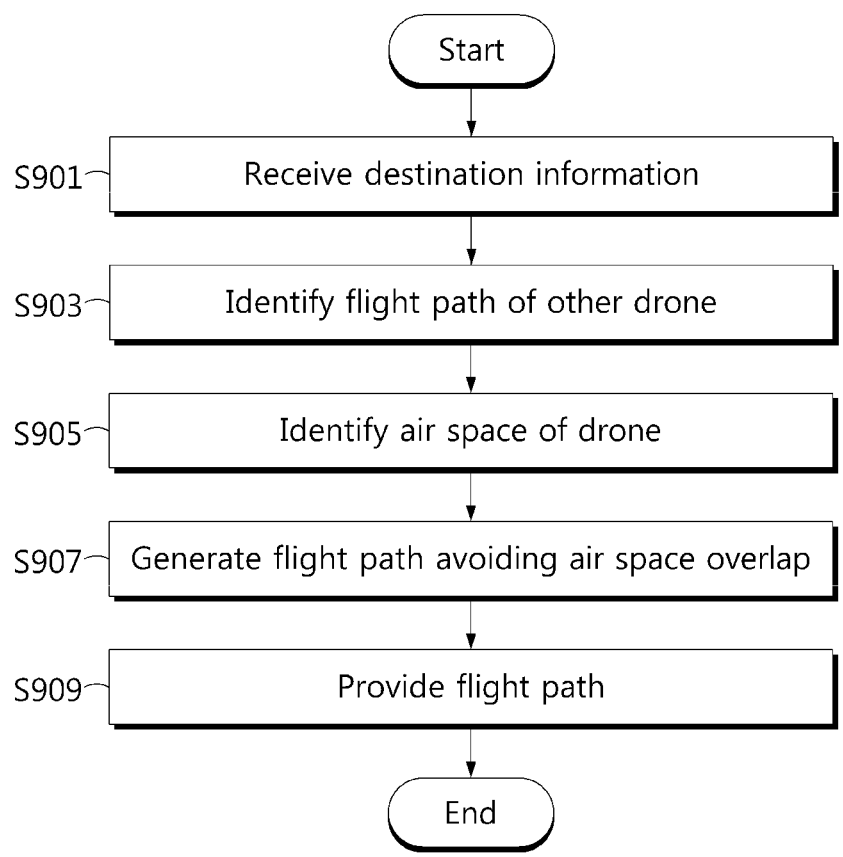
FIG. 9 is a flowchart illustrating a method for generating a flight path reflecting an air space by a flight path setting device according to an embodiment of the present disclosure.

FIG. 9 is a flowchart illustrating a method for generating a flight path reflecting air space by a flight path setting device according to an embodiment of the present disclosure.

Referring to FIG. 9, the flight path generation unit 240 receives origin information, destination information, and flight time of the drone 100 from the drone operator (S901). Subsequently, the flight path generation unit 240 identifies the flight restriction zone stored in the database 250 and identifies the flight path of other drone that is set to fly at the same time as the flight time of the drone 100 (S903).

Subsequently, the flight path generation unit 240 identifies the currently set air space of the drone 100 and the air space of another drone (S905). Additionally, the flight path generation unit 240 generates the flight path including the GPS latitude/longitude coordinates and altitudes records in a sequential order from origin to destination avoiding passing through the flight restriction zone and overlapping the air space of another drone at the same period of time (S907). That is, the flight path generation unit 240 generates the flight path to prevent (avoid) the air space of the drone 100 from passing through the dangerous zone and the air space of another drone 100.

Subsequently, the flight path generation unit 240 stores the generated flight path in the database 250 together with identification information of the drone 100 and provides the flight path to the drone 100 to guide the flight of the drone 100 along the flight path (S909).

Figure 10:
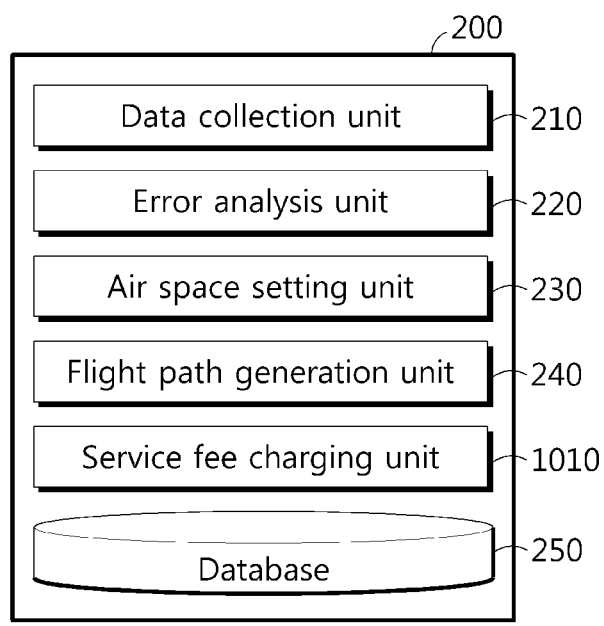
FIG. 10 is a block diagram showing a flight path setting device according to another embodiment of the present disclosure.

FIG. 10 is a block diagram showing a flight path setting device according to another embodiment of the present disclosure. In the flight path setting device 200 of the embodiment described with reference to FIG. 10, the constituent element having the same reference number described with reference to FIG. 2 may perform the same or similar function and operation. As shown in FIG. 10, the flight path setting device 200 further includes a service fee charging unit 1010.

The service fee charging unit 1010 may charge a service fee for the use of the air space of the drone 100 to an owner of the drone 100 and store fee information in the database 250. The service fee charging unit 1010 may differently charge the service fee to the owner of the drone 100 depending on the size of the air space allocated to the drone 100.

When the predetermined reference air space is allocated to the drone 100, the service fee charging unit 1010 may charge the basic fee, and when the size of the air space allocated to the drone 100 changes compared with the reference air space, may increase the service fee by adding a surcharge to the basic fee or reduce the service fee by applying a discount to the basic fee. Here, the reference air space may be equal to all the drones 100 or may be different depending on the size or type of the drone 100. In case that the reference air space is different depending on the size or type of the drone 100, the basic fee may be different for each reference air space.

An example of flexibly charging the service fee depending on the size of the air space is shown in the following [Table 2]. According to the following [Table 2], when the reference air space is allocated, that is, when the air space is maintained, the basic fee is charged, and the size of the air space allocated to the drone 100 is reduced by 90% compared with the reference air space, 20% discount is applied to the basic fee. In contrast, when the size of the air space allocated to the drone 100 is enlarged by 110% compared with the reference air space, 5% surcharge is added to the basic fee to increase the service charge with the increasing size of the allocated air space.

TABLE 2

| Error score (S) | Flight grade | Change of air space | Service fee |
| --- | --- | --- | --- |
| S ≤ 10 | 1 | Reduce air space by 90% | 20% discount of basic fee |
| 10 < S ≤ 20 | 2 | Maintain air space | Basic fee |
| 20 < S ≤ 30 | 3 | Enlarge air space by 110% | 5% surcharge of basic fee |
| 30 < S ≤ 40 | 4 | Enlarge air space by 120% | 10% surcharge of basic fee |
| 40 < S ≤ 50 | 5 | Enlarge air space by 130% | 20% surcharge of basic fee |

In charging the service fee, the service fee charging unit 1010 may differently apply the service fee depending on the size of the air space as well as the flight distance of the drone 100. The service fee charging unit 1010 may increase the service fee as the flight distance increases and may reduce the service fee as the flight distance reduces. Accordingly, when the sizes of the allocated air spaces are equal, as the flight distance increases, the service fee may increase, and as the flight distance reduces, the service fee may reduce.

According to the embodiment described with reference to FIG. 10, it is possible to operate a comparatively larger number of drones 100 in the limited space and increase the profits of the air space manager. In particular, since the drones 100 allocated with larger air spaces due to many flight errors have lower performance and reduce the space for flight of other drones, it is reasonable that they are charged with higher service fees. On the contrary, since the drones 100 allocated with smaller air spaces due to a few flight errors have higher performance and ensure larger spaces for flight of other drones, it is reasonable that they are charged with lower service fees. It is possible to induce the development of the drones 100 having higher performance by charging lower service fees to the drones having higher performance than the drones having lower performance, thereby achieving the flight of a larger number of drones 100 in the narrow space.

While this specification contains many features, the features should not be construed as limiting the scope of the disclosure or the appended claims. Additionally, in the specification, the features described in the respective embodiments may be incorporated into a single embodiment. In the specification, conversely, the various features described in a single embodiment may be implemented in different embodiments separately or in any suitable combination.

Although the drawings illustrate the operations in a specific order, it should not be understood that the operations are performed in the specific order as shown in the drawings or in a sequential order, or all the above-described operations are performed to obtain a desired result. Multitasking and parallel processing may be advantageous in a particular environment. Moreover, it should be understood that all exemplary embodiments do not require the distinction of various system components made in the above-described embodiments. The program components and systems may be commonly implemented as a single software product or multiple software product packages.

The above-described method of the present disclosure may be implemented in program and recorded in a computer-readable recording medium (such as, for example, a compact disk-read only memory (CD ROM), random access memory (RAM), read-only memory (ROM), floppy disk, hard disk, magneto-optical disk, and the like). This process may be easily performed by person having ordinary skill in the technical field pertaining to the present disclosure, and its detailed description is omitted.

While the present disclosure has been hereinabove described in detail, it is obvious to person having ordinary skill in the technical field pertaining to the present disclosure that various substitutions, modifications and changes may be made thereto without departing from the technical aspects of the present disclosure, and the present disclosure is not limited by the above-described embodiments and the accompanying drawings.

What is claimed is:

1. A flight configuration system adapted to set a flight path and an air space of one or more unmanned aerial vehicles (UAVs), the flight configuration system comprising at least one processor configured to:
   generate a predetermined flight path and air space of a first UAV, the predetermined flight path comprising a plurality of coordinate records disposed from an origin point to a destination point, and providing the predetermined flight path to the first UAV, the predetermined flight path and air space generated at least in part based upon an exclusion database comprising predetermined flight paths and air spaces of one or more second UAVs;
   receive one or more timestamped latitude, longitude, and altitude coordinates of the first UAV in flight;
   compare the received timestamped coordinates to corresponding ones of the plurality of coordinate records of the predetermined flight path;
   upon reaching a threshold deviation between the received timestamped coordinates and the plurality of coordinate records of the predetermined flight path, determine an updated air space of the first UAV, generate an updated predetermined flight path of the first UAV based upon at least one of (a) the updated air space and (b) the exclusion database; update the exclusion database with the updated predetermined flight path and updated air space of the first UAV, and provide the updated predetermined flight path to the first UAV, whereby the first UAV is operated based upon the updated flight path, and the one or more second UAVs are operated based upon the updated exclusion database,
   wherein the air space comprises a radius disposed about each of the plurality of coordinate records of the predetermined flight path, and
   wherein the at least one processor is further configured to:
   generate a path error score by comparing the received timestamped coordinates to corresponding ones of the plurality of coordinate records of the predetermined flight path; and
   adjust the air space of the first UAV based on the path error score by adjusting the radius of the air space, wherein the adjusting the air space comprises: comparing the calculated path error score with first and second predetermined threshold values from a stored mapping table; reducing the air space of the first UAV by shortening the radius by a predetermined percentage defined in the mapping table when the path error score is equal to or smaller than the first threshold value; maintaining the air space of the first UAV by maintaining the radius when the path error score is larger than the first threshold value and equal to or smaller than the second threshold value; and enlarging the air space of the first UAV by enlarging the radius by a predetermined percentage defined in the mapping table when the path error score is larger than the second threshold value.

2. The flight configuration system of claim 1, wherein the processor is further configured to determine a wind speed vector along the flight path, to update the predetermined flight path of one or more UAVs based upon observed wind conditions.

3. The flight configuration system of claim 1, wherein the processor is further configured to determine a global positions system (GPS) error ratio, to update the predetermined flight path of one or more UAVs based upon observed GPS inaccuracy.

4. The flight configuration system of claim 1, wherein the at least one processor is configured to compare the received timestamped coordinates to corresponding ones of the plurality of coordinate records of the predetermined flight path by:
   generating at least one of a deviation number, a total deviation distance, a total deviation time, and a deviation area by comparing x, y, z, and t values of each timestamped coordinate of the first UAV in flight with x, y, z, and t values of corresponding ones of the plurality of coordinate records of the predetermined flight path, and generating the path error score based on the calculated deviation number, total deviation distance, total deviation time, and deviation area.

5. A method for operating one or more unmanned aerial vehicles (UAVs), the method comprising:
   by at least one processor of a flight control system:
   generating a predetermined flight path and air space of a first UAV, the predetermined flight path comprising a plurality of coordinate records disposed from an origin point to a destination point, and providing the predetermined flight path to the first UAV, the predetermined flight path and air space generated at least in part based upon an exclusion database comprising predetermined flight paths and air spaces of one or more second UAVs;
   receiving one or more timestamped latitude, longitude, and altitude coordinates of the first UAV in flight;
   comparing the received timestamped coordinates to corresponding ones of the plurality of coordinate records of the predetermined flight path;
   upon reaching a threshold deviation between the received timestamped coordinates and the plurality of coordinate records of the predetermined flight path, determining an updated air space of the first UAV, generating an updated predetermined flight path of the first UAV based upon at least one of (a) the updated air space and (b) the exclusion database, updating the exclusion database with the updated predetermined flight path and updated air space of the first UAV, and providing the updated predetermined flight path to the first UAV, whereby the first UAV is operated based upon the updated flight path, and the one or more second UAVs are operated based upon the updated exclusion database,
   wherein the air space comprises a radius disposed about each of the plurality of coordinate records of the predetermined flight path, and
   wherein the method further comprises:
   generating a path error score by comparing the received timestamped coordinates to corresponding ones of the plurality of coordinate records of the predetermined flight path; adjusting the air space of the first UAV based on the path error score by adjusting the radius of the air space, wherein the adjusting the air space comprises: comparing the calculated path error score with first and second predetermined threshold values from a stored mapping table; reducing the air space of the first UAV by shortening the radius by a predetermined percentage defined in the mapping table when the path error score is equal to or smaller than the first threshold value; maintaining the air space of the first UAV by maintaining the radius when the path error score is larger than the first threshold value and equal to or smaller than the second threshold value; and enlarging the air space of the first UAV by enlarging the radius by a predetermined percentage defined in the mapping table when the path error score is larger than the second threshold value.

6. The method of claim 5, further comprising determining a wind speed vector along the flight path, to update the predetermined flight path of one or more UAVs based upon observed wind conditions.

7. The method of claim 5, further comprising determining a global positions system (GPS) error ratio to update the predetermined flight path of one or more UAVs based upon observed GPS inaccuracy.

8. The method of claim 5, wherein comparing the received timestamped coordinates to corresponding ones of the plurality of coordinate records of the predetermined flight path comprises:

generating at least one of a deviation number, a total deviation distance, a total deviation time, and a deviation area by comparing x, y, z, and t values of each timestamped coordinate of the first UAV in flight with x, y, z, and t values of corresponding ones of the plurality of coordinate records of the predetermined flight path, and generating the path error score based on the calculated deviation number, total deviation distance, total deviation time, and deviation area.

* * * * *